United States Patent [19]

Szpur

[11] 3,852,196
[45] Dec. 3, 1974

[54] FLUID TREATMENT SYSTEM
[75] Inventor: Roman Szpur, Kettering, Ohio
[73] Assignee: Vital Research & Development, Inc., Dayton, Ohio
[22] Filed: Sept. 8, 1972
[21] Appl. No.: 287,480

[52] U.S. Cl.................. 210/133, 210/234, 210/235
[51] Int. Cl....................... B01d 35/02, B01d 27/10
[58] Field of Search............ 210/DIG. 14, 130, 133, 210/234, 235

[56] References Cited
UNITED STATES PATENTS

| | | | |
|---|---|---|---|
| 523,815 | 7/1894 | Krix | 210/234 |
| 2,211,305 | 8/1940 | Werder | 210/133 |
| 2,955,712 | 10/1960 | Guthowski | 210/133 X |
| 3,080,972 | 3/1963 | Smith | 210/133 X |
| 3,319,791 | 5/1967 | Home | 210/234 |
| 3,363,762 | 1/1968 | Ensign | 210/234 X |
| 3,526,251 | 9/1970 | Rosaen | 210/234 |
| 3,628,662 | 12/1971 | Kudlary | 210/234 |
| 3,715,032 | 2/1973 | Nicto | 210/133 |

Primary Examiner—Theodore A. Granger
Attorney, Agent, or Firm—Jacox & Meckstroth

[57] ABSTRACT

A filter cartridge unit includes a body of filtering media enclosed within a container which is releasably connected to a projecting tubular portion of a valve body adapted to be installed within a fluid line such as a water supply line. A cylindrical valve chamber extends into the valve body through the tubular portion and receives a spool-like valve member. When the filter unit is connected or coupled to the valve body, concentric tubes projecting from the filter container extend into the valve chamber and automatically shift the valve member against a spring bias to a position where fluid flows from the inlet passage of the valve body through the valve member and is by-passed by the concentric tubes through the filter unit to the outlet passage within the valve body. When the filter unit is disconnected and removed, the valve member automatically shifts to a second position which enables the fluid to flow directly from the inlet passage through the valve chamber to the outlet passage.

3 Claims, 3 Drawing Figures

PATENTED DEC 3 1974　　　　　　　　　　　3,852,196

FLUID TREATMENT SYSTEM

BACKGROUND OF THE INVENTION

In the installation of a filter system within a fluid supply line, it is desirable to provide for quickly and conveniently removing the filtering media which is commonly enclosed within a fluid-tight container. Usually, a set of valves are provided in the fluid supply line and are manually actuated to closed positions during the time the container enclosing the filering media is removed for replacing the filtering media or for exchangement with another container having a reconditioned or new filtering media. During this time period, there is no flow of fluid through the supply line unless a by-pass network is installed within the line. There have also been proposals to provide for automatic shut-off of the fluid supply line while the filter unit is being replaced, for example, as shown in U.S. Pat. Nos. 2,932,400 and 3,283,907. However, the devices disclosed in these patents are complex and expensive in construction.

It is also common for a liquid-type fluid to drip or spill from the media container of from the filter support fitting or housing which is installed within the fluid supply line. When such a filtering system is installed within a water supply line for a residence or a place of business, the use of cut-off valves and a by-pass network adds significantly to the installation costs of the filter system. Furthermore, the dripping or leakage of water during the exchange of the filtering media, is undesirable.

SUMMARY OF THE INVENTION

The present invention is directed to an improved fluid treatment device or system which is of simplified and economical construction and which is adapted to be easily installed within a fluid supply line. As used herein, the term fluid is intended to include both a liquid and a gas. The system of the invention also provides for quickly and conveniently exchanging or replacing a container of filtering or treating media and, in addition, automatically provides for continued flow of the fluid through the line while the container of media is being replaced or exchanged. As another feature, the fluid treatment system of the invention eliminates the problem of dripping which usually results when a liquid filtering media is exchanged.

In accordance with the illustrated embodiment of the invention, a valve body has aligned inlet and outlet ports or passages which are connected to a laterally extending cylindrical bore forming a valve chamber. The valve chamber extends through an externally threaded tubular portion of the valve body, and a spool-like valve member is supported for sliding axial movement within the valve chamber. The valve member is connected to an axially extending rod which engages a compression coil spring enclosed within a tubular fitting projecting from the valve body.

A disposable cartridge type filter unit includes a liquid-tight container preferably molded of a plastics material. The container encloses a relatively solid body of filtering media supported by a fluid inlet tube which extends concentrically through an internally splined inner tubular portion of the container. This inner tubular portion of the container projects into the cylindrical valve chamber and is surrounded by an internally threaded outer tubular neck portion of the container. The outer tubular neck portion of the container connects with the externally threaded tubular portion of the valve body to form a connection or positive coupling between the filter unit and the valve body.

When the filter unit is coupled or connected to the valve body, the outer end of the inlet tube projecting from the filter container, engages the valve member and shifts it to a position where fluid is supplied from the inlet passage of the valve body through a center passage within the valve member to the inlet tube of the filter unit. From the inlet tube, the fluid is directed through the filtering media and then through the passages defined between the internal spline surrounding the inlet tube to the outlet passage of the valve body.

When the filter unit is removed or disconnected from the valve body, the valve member automatically shifts to a position which provides for direct flow of the fluid from the inlet passage through the valve chamber to the outlet passage.

Other features and advantages will be apparent from the following description, the accompanying drawing and the appended claims.

DESCRIPTION OF THE PREFERRED EMBODIMENT

Figure 1:
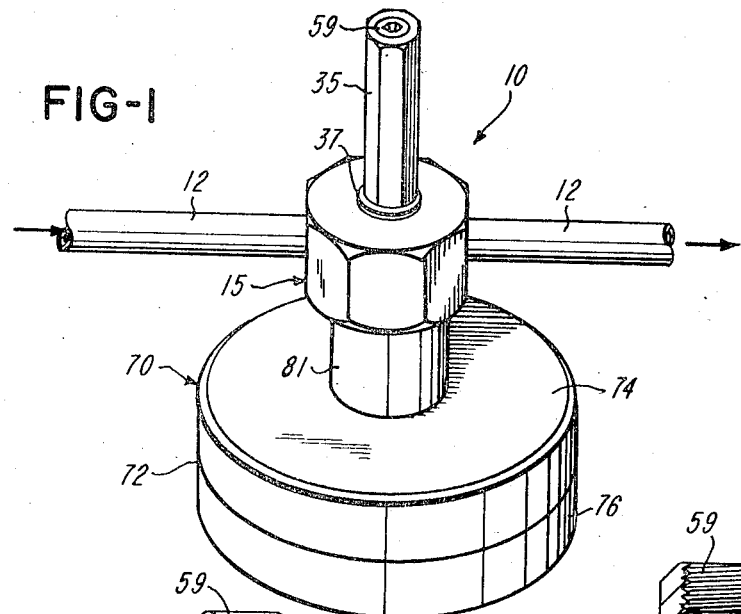
FIG. 1 is a perspective view of a liquid filter system constructed in accordance with the invention.

Referring to FIG. 1, a filter system 10 is installed within a fluid supply line 12, for example, the water supply line for a residence. However, it is to be understood that the filter system 10 may be used in conjunction with a line conducting any type of fluid or may be formed as a part of another device as will be apparent. The filter system 10 includes a valve body 15 which may be formed of metal or a suitable plastics material and which may be octagonal as shown or of other configuration. The valve body 15 includes an inlet port or passage 16 and an axially aligned outlet port or passage 18 on the opposite side of the body. Preferably, the passages 16 and 18 have internal threads for receiving corresponding threaded ends of the fluid supply line 12. The inlet passage 16 is connected by a smaller diameter passage 21 to a cylindrical bore 24 which extends laterally or vertically through the valve body 15 and defines a cylindrical valve chamber 25.

The valve chamber 25 extends through a projecting tubular portion 28 of the valve body 15, and the tubular portion 28 is formed with external threads 29. A port or passage 31 connects the valve chamber 25 to the outlet passage 18 and is positioned on an incline or angle so that it connects with the valve chamber 25 in the area where the tubular portion 28 connects with the remaining portion of the valve body 15. A bleeder port or passage 33 extends at an angle from the inlet passage 21 and connects with the valve chamber 25 above the passage 21. The upper or inner end of the valve chamber 25 is closed by an elongated tubular fitting 35 which is secured to the valve body 15 by a threaded connection 36 in axially aligned relation with the valve chamber 25. The fitting 35 is sealed to the valve body 15 by a sealing washer 37 and has an axially extending cylindrical bore or chamber 38 which is connected to the valve chamber 25 by a smaller diameter bore 39.

A spool-like valve member 45 is slidably supported within the valve chamber 25 and includes opposite cylindrical end portions 46 and 48 integrally connected by a cylindrical neck portion 49 of reduced diameter. A circumferential groove is formed within each of the cylindrical end portions 46 and 48 of the valve member 45 and receives a corresponding resilient O-ring 51 to form a fluid-tight seal between each end of the valve member 45 and the bore 24. A cylindrical guide rod 54 projects axially from the valve member 25 and extends through the bore 39 into the chamber 38 of the fitting 35. Preferably, the guide rod 54 is formed as an integral part of the valve member 45.

A retaining ring 56 is secured to the outer or upper end portion of the guide rod 54, and a compression coil spring 58 extends within the chamber 38 from the outer end of the guide rod 54 to a tapered plug 59 threaded into an opening formed in the outer end portion of the fitting 35. The plug 59 forms a water-tight closure for the chamber 38. A port or passage 61 extends radially through the neck portion 49 of the valve member 45 and connects with a passage 62 which extends axially downwardly through the end portion 48 of the valve member 45 to a frusto-conical recess 63 formed within the lower end portion of the valve member.

A cartridge-type filter unit 70 includes a housing or container 72 which is molded of a suitable plastics material in two mating sections, an inverted cup-shaped upper section 74 and a cup-shaped lower section 76. The sections 74 and 76 are connected by an interfitting cemented joint 77 which forms a fluid-tight enclosed chamber 78 within the container 72. The filter unit 70 is of a simple and inexpensive construction so that it may be disposable.

The upper section 74 of the container 72 includes an upwardly projecting annular or outer tubular portion 81. The portion 81 has internal threads which mate with the external threads on the tubular extension portion 28 of the valve body 15 to form a releasable coupling between the valve body 15 and the filter unit 70. The upper section 74 of the filter container 72 also includes an inner tubular portion 82 which is concentric with the outer tubular portion 81 and slidably fits within the bore 24 of the valve body 15. An O-ring 83 is confined within a circumferential groove within the lower end of the tubular portion 28 and forms a fluid-tight seal between the tubular portion 82 and the tubular extension portion 28 of the valve body 15.

Figures 2, 3:
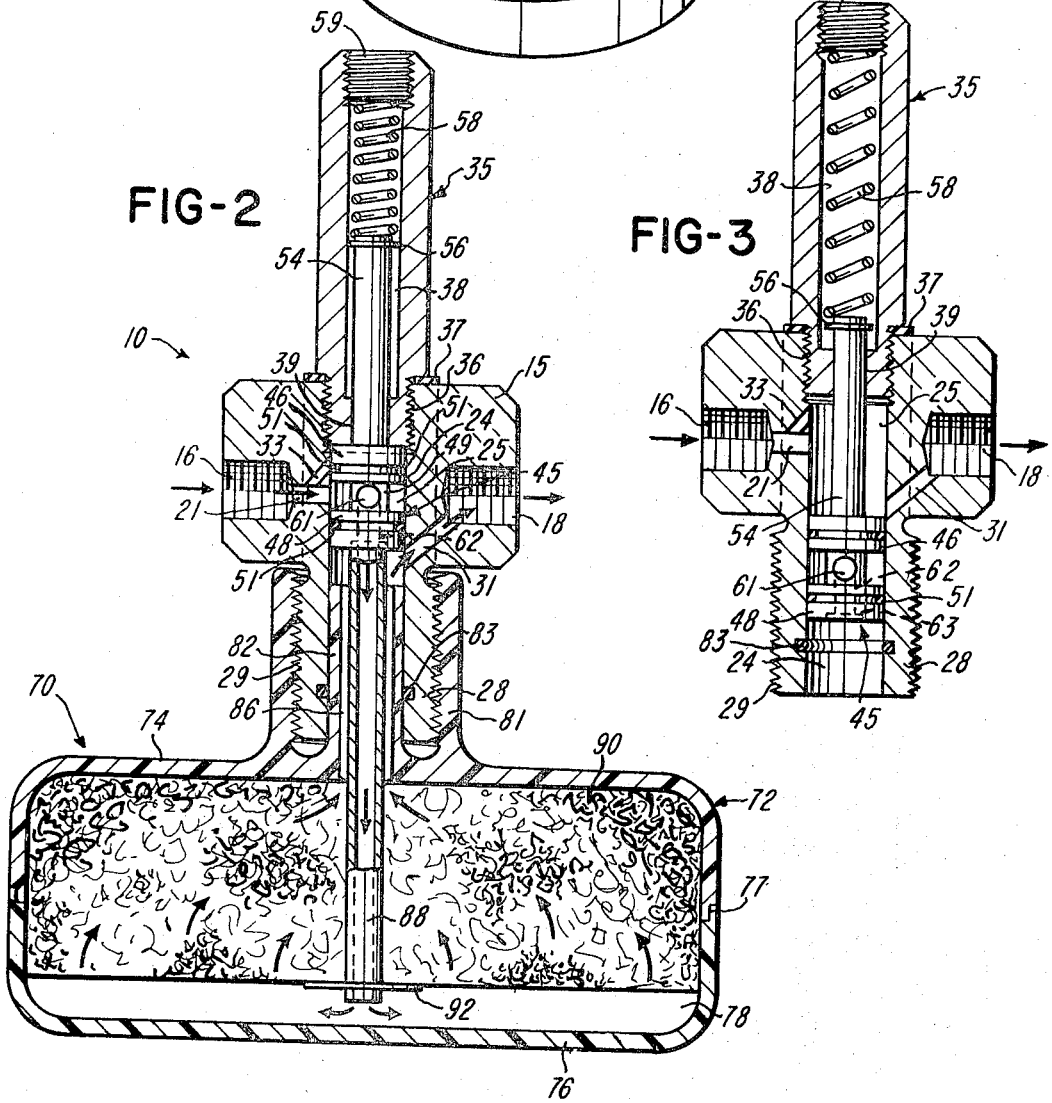
FIG. 2 is an axial section through the filter system shown in FIG. 1 and illustrating the relationship of the internal components when the cartridge-type filter unit is attached.
FIG. 3 is an axial section similar to FIG. 2 and illustrating the relationship of part of the internal components when the filter unit is removed.

The inner tubular portion 82 of the upper filter container section 74 has an axially extending internal spline 86 which engages and retains an elongated inlet tube 88 concentrically within the tubular portion 82 of the filter container 72. The spline 86 also defines axially extending passages surrounding the inlet tube 88, and these passages connect the filter chamber 78 with the valve chamber 25. The inlet tube 88 is press fitted into the spline 86 and has an upper end portion which projects upwardly from the inner tubular portion 82 of the container section 74. As shown in FIG. 2, the upper end portion of the inlet tube 88 projects into the valve chamber 25 and seats within the recess 63 formed on the lower end of the valve member 45 so that the axially extending passage defined by the inlet tube 88 forms an extension of the passage 62 within the valve member 45.

An annular body 90 of substantially rigid filter material or media is confined within the filter container 72 and is supported above the bottom wall of the lower container section 76 by a retaining ring or washer 92 mounted on the lower end portion of the inlet tube 88. Thus a space is defined between the lower surface of the media body 90 and the bottom wall of the filter container 72. The filtering material or media may consist of various materials depending upon the material, element or compound which is desired to be filtered from the fluid flowing within the supply line 12. In one application, chlorine is filtered from water within the supply line 12 by a media body 90 of a charcoal material or a resin which is also capable of filtering chlorine from the water.

The filtering system operates in the following manner. When the filtering unit 70 is coupled to the valve body 15 as shown in FIG. 2, fluid flows from the inlet port 16 through the passage 21 and to the valve chamber 25 between the end portions 46 and 48 of the valve member 45. The passages 61 and 62 conduct the fluid to the upper end of the inlet tube 88, and the tube 88 directs the fluid to the filter chamber 78 below the filtering media body 90. After the fluid filters upwardly through the media body, the fluid flows into the passages defined by the spline 86 between the inlet tube 88 and the inner tubular portion 82 and returns to the valve chamber 25 under the valve member 45. The filtered fluid then flows from this portion of the chamber 25 through the passage 31 to the outlet passage or port 18. The compression spring 58 assures that a fluid-tight seal is formed between the lower end of the valve member 45 and the upper end of the inlet tube 88 which projects into the mating recess 63 surrounding the passage 62.

When it is desired to remove and replace the filter unit 70, the unit is unthreaded from the projecting tubular portion 28 of the valve body 15. As the inlet tube 88 and the inner tubular portion 82 of the filter container 72 move outwardly or downwardly within the valve chamber 25, the forces exerted by the spring 58 and hydraulic pressure on the valve member 45 are effective to move the valve member downwardly or outwardly within the valve chamber 25 until the retaining ring 56 seats on the inner shoulder at the lower end of the chamber 38, as shown in FIG. 3. When the valve member 45 is in this position, the fluid flows directly from the inlet passage 21 through the valve chamber 25 to the outlet passage 31. The valve member 45, including the upper O-ring 51, forms a fluid-tight closure for the lower end portion of the valve chamber 25.

When a new or reconditioned filter unit 70 is recoupled to the tubular extension portion 28 of the valve body 15, the upper end of the inlet tube 88 engages the valve member 45 and shifts it back to the by-pass position (FIG. 2) against the biasing force exerted by the compression spring 58. As the valve member 45 moves upwardly within the valve chamber 25, the fluid displaced within the valve chamber 25 flows back upstream into the line 12 through the inlet passage 21, the bleeder passage 33 and the inlet port 16.

From the drawing and the above description, it is apparent that a fluid treatment system constructed in accordance with the present invention, provides desirable features and advantages. For example, whenever it is desirable to replace a filter cartridge or unit 70, it is only necessary to disconnect or unscrew the filter unit from the valve body 15 and to replace it with a new filter unit. During this exchangement of filter units, the flow of fluid is interrupted only for a few seconds while the filter unit 70 is being unthreaded and rethreaded. After the new filter cartridge or unit 70 is reconnected to the valve body 15, the flow of fluid automatically by-passes through the filter unit as soon as the filter unit has formed a positive threaded connection with the valve body. Furthermore, when the filter cartridge or unit 70 is removed, the small volume of fluid within the valve chamber 25 under the valve member 45 collects within the annular chamber defined between the outer tubular portion 81 and the inner tubular portion 82 of the filter container 72. As a result, no fluid drips from the valve member 15 or filter unit 70 during exchange of the filter units.

While the structure herein described constitutes a preferred embodiment of the invention, it is to be understood that the invention is not limited to this precise form of structure, and that changes may be made therein without departing from the scope and spirit of the invention as defined in the appended claims. For example, the assembly of the valve body 15 and valve member 45 may be used for by-passing the fluid through some other form of fluid treatment system instead of the filter unit 70.

The invention having thus been described, the following is claimed:

1. A fluid treatment system comprising a valve body including means defining an inlet passage and an outlet passage adapted to receive a fluid, said valve body having an elongated internal cylindrical valve chamber intersecting said inlet and outlet passages, said valve chamber having a first inner end portion and a second outer end portion, a cylindrical valve member slidably supported within said valve chamber for axial movement between a first position adjacent said inner end portion and a second position adjacent said outer end portion, said valve member including a first cylindrical inner portion and a second cylindrical outer portion disposed in axially spaced relation and each having an outer diameter conforming to the diameter of said valve chamber, a circumferentially extending sealing member on each of said inner and outer portions of said valve member and forming a sliding fluid-tight seal with said body, means defining a radially extending fluid passage within said valve member between inner and outer portions of said valve member, means defining a passage extending axially through said second outer portion of said valve member to intersect said radially extending passage, means defining a bleed passage within said valve body for connecting said inlet passage to said second inner end portion of said valve chamber, a fluid-tight container enclosing a fluid treating media, means for removably connecting said container to said valve body and including a cylindrical outer tube having an outer diameter substantially the same as the inner diameter of said valve chamber and an inner tube spaced concentrically within said outer tube and having an end portion positioned to engage said second outer portion of said valve member for removably connecting said end portion of said inner tube to said valve member second outer portion, said passages within said valve member cooperating with said inner and outer tubes to by-pass fluid from said inlet passage through the treating media within said container and then to said outlet passage in response to said valve member being in said first position, said valve member constructed and arranged to block the flow of fluid from said inlet passage through said outer end of said valve chamber in response to said valve member being in said second position when said container is removed, and said valve member being movable between said first and second positions in response to axial movement thereof by said inner and outer tubes being inserted into said outer end portion of said valve chamber.

2. A fluid treatment system as defined in claim 1 including an elongated guide member extending axially from said inner portion of said valve member and movable therewith, means forming an outwardly projecting shoulder on said guide member, means on said valve body forming a stop surface for engagement by said shoulder to limit the axial movement of said valve member at said second position, a tubular member projecting outwardly from said inner end portion of said valve chamber on a side opposite to said container and surrounding said guide member, and a compression spring extending between said guide member and said tubular member.

3. A fluid treatment system as defined in claim 1 wherein said treating media comprises a generally solid body, said inner tube extends through said body of treating media, and means on said inner tube for supporting said body of treating media with the lower surface thereof spaced above the bottom of said container.

* * * * *